(12) United States Patent
Crowther et al.

(10) Patent No.: US 9,061,347 B2
(45) Date of Patent: Jun. 23, 2015

(54) METHOD OF SEALING COOLING HOLES

(71) Applicant: ROLLS-ROYCE PLC, London (GB)

(72) Inventors: Simon John Crowther, Derby (GB); Michiel Kopmels, Bristol (GB)

(73) Assignee: ROLLS-ROYCE plc, London (GB)

( * ) Notice: Subject to any disclaimer, the term of this patent is extended or adjusted under 35 U.S.C. 154(b) by 407 days.

(21) Appl. No.: 13/739,822

(22) Filed: Jan. 11, 2013

(65) Prior Publication Data
US 2013/0185937 A1    Jul. 25, 2013

(30) Foreign Application Priority Data

Jan. 18, 2012  (GB) .................................. 1200770.4

(51) Int. Cl.
| | | |
|---|---|---|
| B21K 3/04 | (2006.01) | |
| F01D 5/00 | (2006.01) | |
| F01D 5/18 | (2006.01) | |

(52) U.S. Cl.
CPC ............ *B21K 3/04* (2013.01); *Y10T 29/49318* (2015.01); *F01D 5/005* (2013.01); *F01D 5/186* (2013.01)

(58) Field of Classification Search
CPC .. B05D 3/0218; B05D 3/0227; B05D 3/0236; B05D 3/0245; B21K 3/04; F01D 5/005; Y10T 209/49318

USPC .......... 264/265, 259; 73/1.16, 1.17, 40, 49.2, 73/49.3; 29/889.721, 889.72, 889.7, 424, 29/404, 447, 537.2, 530; 427/314, 318
See application file for complete search history.

(56) References Cited

U.S. PATENT DOCUMENTS

| | | | | |
|---|---|---|---|---|
| 3,720,533 | A | * | 3/1973 | Gallagher ..................... 427/185 |
| 4,098,632 | A | * | 7/1978 | Sprague, Jr. .................. 156/295 |
| 4,743,462 | A | * | 5/1988 | Radzavich et al. ........... 427/448 |
| 5,902,647 | A | * | 5/1999 | Venkataramani et al. .... 427/454 |
| 6,265,022 | B1 | * | 7/2001 | Fernihough et al. .......... 427/142 |
| 6,335,078 | B2 | * | 1/2002 | Venkataramani et al. .... 428/139 |
| 7,083,824 | B2 | * | 8/2006 | Stankowski et al. .......... 427/142 |
| 7,147,899 | B2 | * | 12/2006 | Fernihough et al. .......... 427/508 |
| 7,192,622 | B2 | * | 3/2007 | Fernihough et al. .......... 427/157 |
| 7,772,314 | B2 | * | 8/2010 | Fernihough et al. .......... 524/492 |
| 8,844,090 | B2 | * | 9/2014 | D'Amour et al. ............. 15/244.1 |

OTHER PUBLICATIONS

British Search Report issued in Application No. 1200770.4; Dated Apr. 23, 2012.

* cited by examiner

*Primary Examiner* — Jason L Vaughan
(74) *Attorney, Agent, or Firm* — Oliff PLC

(57) ABSTRACT

A method of selectively sealing at least one cooling hole provided on an aerofoil component (10). The method comprises applying a thermoplastic material to one or more selected cooling holes (12, 14) in a molten phase, and cooling the thermoplastic material to set the thermoplastic material.

7 Claims, 2 Drawing Sheets

METHOD OF SEALING COOLING HOLES

BACKGROUND OF THE INVENTION

The present invention relates to a method of sealing cooling holes provided on an aerofoil component.

Hollow aerofoil components such as turbine blades and nozzle guide vanes provided in gas turbine engines often comprise cooling holes, which extend from the hollow interior of the component to the exterior to provide a cooling air film in use, and thereby cool the surface of the component.

It is sometimes necessary to test the performance of such cooling holes, for example to validate a new component design, or to diagnose blockages during engine overhaul or repair.

Such aerofoil components often include a plurality of cooling holes arranged in closely spaced rows along the blade, as shown in FIG. 1. In order to test one cooling hole or a row of cooling holes, it is necessary to selectively seal the remaining cooling holes. Such seals must later be removed, so that other cooling holes can be tested, or to allow the blade to be reinstalled in an engine.

One previous method of selectively sealing cooling holes comprises using thin strips of tape to cover selected cooling holes. However, the tape can sometimes not provide a sufficiently robust seal, and is difficult to apply accurately. Additionally, tape is generally reinforced with quick setting epoxy such as Araldite™. The use of this material generally means that the components are unusable after the application of these materials.

A further known method comprises applying a ultra-violet (UV) curable material to one or more cooling holes, and subsequently curing the material using UV light. However, once cured, UV curable materials cannot be reformed. As a result, if the seal is found to be inadequate subsequent to curing, it cannot be repaired, and must instead be removed and reapplied. The UV curing process typically takes 30-60 seconds. UV curable material is also relatively expensive, and relatively large quantities are required to adequately seal cooling holes. UV curable material is also toxic, and is known to release toxic fumes during the curing process. The fumes need to be removed using local ventilation and the operator who applies the UV curable material will have to wear protective gloves and goggles.

The present invention provides an improved method of sealing cooling holes that addresses some or all of the aforementioned problems.

SUMMARY OF THE INVENTION

According to a first aspect of the invention, there is provided a method of selectively sealing at least one cooling hole provided on an aerofoil component, the method comprising: applying a thermoplastic material to one or more selected cooling holes in a molten phase; and cooling the thermoplastic material to set the thermoplastic material.

It has been found that by applying a thermoplastic material to the cooling holes, a robust seal can be provided, which cures in a relatively short time and can be melted and reformed to permit repair of a defective seal.

The method may comprise heating a surface of the aerofoil component such that the surface is above room temperature while the thermoplastic material is applied to facilitate adhesion. The surface of the aerofoil component may be heated to between 50° C. and 60° C. The surface of the aerofoil component may be heated by an air gun, and the air provided by the airgun may have a temperature of between 140° C. and 170° C.

By heating the surface of the aerofoil component prior to applying the thermoplastic material, the time taken for the thermoplastic to solidify is increased. As a result, the thermoplastic material remains in its molten state for a longer duration, and so provides a larger wetted surface in contact with the surface of the aerofoil component, thereby leading to improved sealing of the cooling holes.

The thermoplastic material may comprise Ethylene-vinyl acetate (EVA). The thermoplastic material may comprise Tec-Bond 240™, or may comprise Tec-Bond 260v.

BRIEF DESCRIPTION OF THE DRAWINGS

The present invention will be more fully described by way of example with reference to the accompanying drawings, in which.

DETAILED DESCRIPTION OF THE PREFERRED EMBODIMENTS

Figure 1:
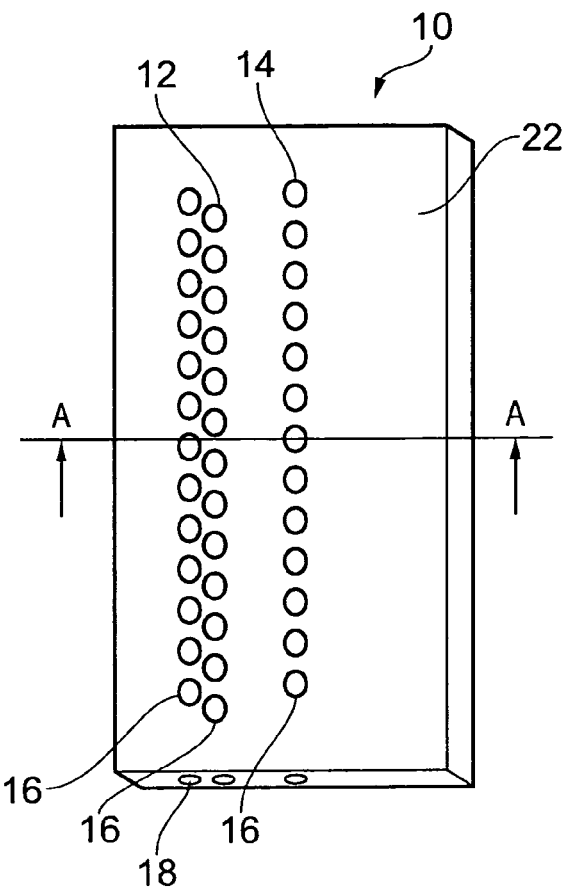
FIG. 1 is a simplified perspective view of a turbine blade having a plurality of cooling holes.
Figure 2A:
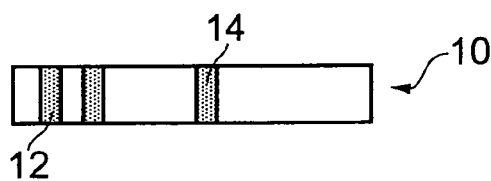
FIGS. 2A, 2B, 2C and 2D are cross sectional views through the lines A-A of the turbine blade shown in FIG. 1, in which progressively more holes are blocked in accordance with the present invention.
Figure 2B:
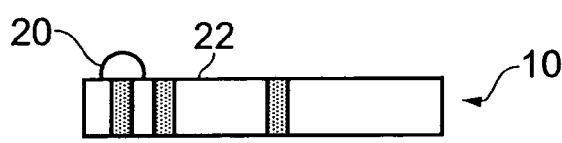
Figure 2C:
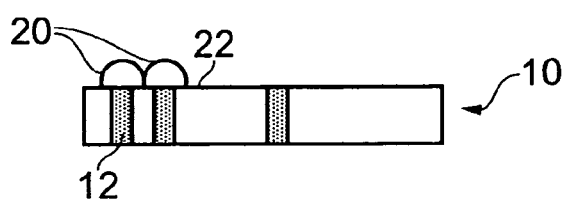
Figure 2D:
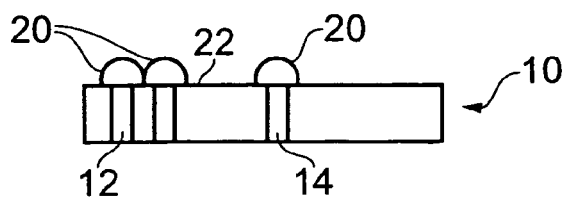

FIG. 1 shows a plan view of an aerofoil component in the form of a turbine blade 10. The turbine blade is generally hollow, and includes a plurality of cooling holes 12, 14, arranged in a plurality of rows 16 on a surface 22 of the blade 10. The blade 10 is generally formed of a Nickel alloy, and may be covered with a ceramic thermal barrier coating. Passages 18 are provided extending from the root of the blade 10 to the cooling holes 12, 14. When installed on a gas turbine engine (not shown), cooling air can be transmitted through the passages 18 to the cooling holes 12, 14 to provide film cooling air adjacent an external surface 22 of the blade 10.

During testing of the blade 10, for instance to validate a new component design, or to diagnose blockages during engine overhaul or repair, one or more cooling holes 12, 14 or rows of cooling holes 16 are blocked to provide a seal therearound using the following method.

In a first embodiment, the surface immediately surrounding the cooling holes 12, 14 selected for sealing on the external surface 22 at least of the blade 10 is heated to a temperature above 20° C., and preferably to a temperature of around 50° C. to 60° C. in a heating step. The heating step could be carried out using any suitable process. For example, hot air could be applied to the surface 22 using an air gun. Where an air gun is used, the hot air supplied by the air gun is supplied at a temperature of between 140° C. and 170° C. This has been found to be sufficient to provide a surface temperature of 50° C. to 60° C. Alternatively, the whole component could be placed in an oven during the heating step. In a still further alternative, an electrical current could be conducted or induced in the component to provide resistive or inductive heating.

Figure 3A:
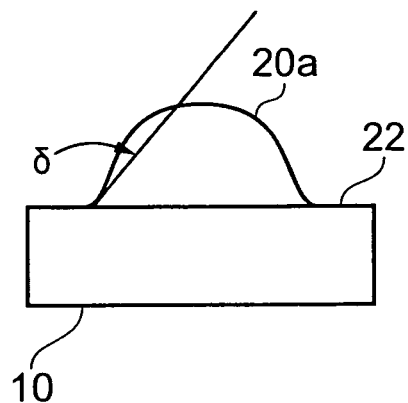
FIG. 3A is a profile view of a cooling hole sealed using a first method in accordance with the present invention.

Subsequent to the heating step, a bead 20a of thermoplastics material in the form of Tecbond™ thermoplastic hot melt adhesive in a molten phase (i.e. above the melting point of the material) is applied to the selected holes 12, 14 or rows 16 that are to be sealed, such that the selected holes are covered and substantially blocked by the adhesive, leaving the remaining unselected holes uncovered (as shown in FIG. 3A).

In one embodiment, all of the cooling holes may be sealed using the above method, and the sealed cooling holes 12, 14 tested for leaks (as described in further detail below). The bead covering a selected row 16 of cooling holes may then be removed for testing the performance of the selected row of cooling holes. By using this method, the sealed cooling holes 12, 14 can be tested for leaks prior to testing the performance of the selected row of cooling holes 16.

The particular type of adhesive used will depend on a number of factors, including the required strength of the bond, and the properties of the aerofoil component. Where the aerofoil component comprises Nickel alloy having a ceramic thermal barrier coating, Tec-Bond 240™ or Tec-Bond 260™ have been found to provide a good seal, which is sufficiently strong for testing, but can be readily removed or repaired, as described below.

Applying the adhesive at a temperature of approximately 200° C. has been found to result in the adhesive having the correct viscosity to flow over the surface 22 to cover the selected holes 12, 14, or rows of holes 16, but not the unselected holes. Following application of adhesive to all of the selected holes 12, 14 or rows of holes 16, the adhesive beads 20a are then cooled such that the adhesive sets (i.e. solidifies) to form a seal against the respective hole 14, 16, as shown in FIG. 3A. The beads 20a could be actively cooled by, for instance, placing the component in a refrigerated environment. Alternatively, the beads could be allowed to cool at room temperature (i.e. around 20° C.). The cooling time may be controlled by, for instance, controlling the ambient temperature or airflow around the surface 22 during cooling. Each row of sealing holes 16 is sealed individually using the above method, until all of the selected rows 16 are sealed, as shown in FIGS. 2A to 2D. Alternatively, individual sealing holes 16 may be individually sealed, depending on requirements.

In a second embodiment, the step of heating the surface of the component could be omitted, and a bead 20b of molten thermoplastic material could be applied with the surface 22 at room temperature, i.e. around 20° C., and allowed to cool.

Figure 3B:
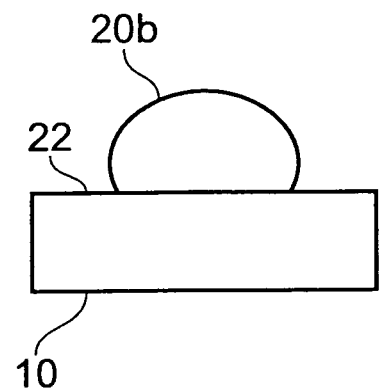
FIG. 3B is a profile view of a cooling hole sealed using a second method in accordance with the first aspect of the present invention.

FIGS. 3A and 3B show the beads 20a, 20b applied with and without the step of heating the surface of the blade respectively: The heating step results in the blade surface 22 (or at least the part of the blade surface 22 surrounding the selected holes 12, 14, or rows of holes 16) being at a higher temperature (i.e. around 50° C. to 60° C.) when the adhesive bead 20a is applied, relative to when the heating step is omitted. As a result, the bead 20a cools more slowly and more evenly than when the bead is applied at room temperature, resulting in the bead 20a, and particularly the portion of the bead 20a in contact with the blade surface 22, remaining in the molten phase for a longer period in comparison to the bead 20b. As a result, the bead 20a can spread further across the surface 22 before solidifying, thereby resulting in a larger surface area of the bead 20a in contact with the surface 22, thereby forming an improved seal. However, such a heating step increases the time taken to seal each hole 12, 14 or row of holes 16, due to both the time taken to heat the surface 22 and the longer cooling time.

In contrast, where the heating step is omitted as in the embodiment shown in FIG. 3B, part of the bead 20b in contact with the surface 22 cools very quickly when applied to the surface. As a result, the part of the bead 20b in contact with the surface 22 solidifies very quickly and contracts, resulting in a more spherical, less flattened shape relative to bead 20a, and thus a lower area in contact with the surface 22. The rounded shape of the bead 20b is also easier to peel off relative to the flattened shape of the bead 20a.

Figure 4:
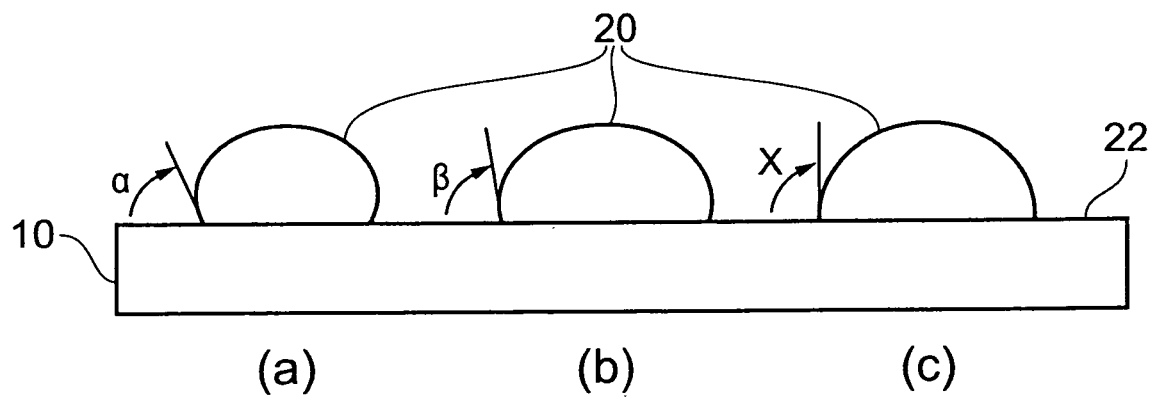
FIG. 4 shows a profile view of cooling holes sealed using the method of FIG. 3B, in which the surface is heated to progressively higher temperatures.

As shown in FIG. 4, where the heating step is employed, a surface temperature can be selected which results in a desired contact area between the bead 20 and the surface 22 of the blade 10. The degree of adhesion between the bead 20 and the blade 10 can therefore be altered by altering the temperature to which the surface 22 is heated during the heating step.

Once the adhesive has solidified, the blade 10 can be tested by passing a pressurised fluid such as air into the passages 18 to the cooling holes 12, 14. A leak detection spray (such as water mixed with a detergent) is then sprayed onto the cooling holes. The presence of bubbles adjacent the beads 20 would reveal that the seal is defective. In some circumstances, it has however been found that the leak detection spray can find its way between the bead 20 and the surface 22 of the blade, which can result in the bead 20 peeling from the surface 22 prematurely. By heating the blade 10 prior to applying the adhesive, the angle between the side of the bead 20 and the surface 22 is altered, as shown by angles α, β, γ and δ in FIGS. 3A and 4. It can therefore be seen that, as the temperature of the surface 22 of the blade 10 is increased, it becomes progressively harder for the leak detection spray to find its way between the bead 20 and the surface 22 of the blade 10.

If one or more of the seals is found to be defective, i.e. they allow some air to pass therethrough during testing, the seals can be repaired. This can be done either by adding further material as above, or by applying localised heat (for example using a soldering iron or glue gun tip) to the defective bead 20a, 20b, such that it is heated above its melting point. The melted bead 20a, 20b is then allowed to flow over the surface to thereby cover the defect. The repaired bead 20a, 20b is then allowed to cool, and the blade 10 can be tested again. The present invention therefore permits the seals to be repaired, without removing or necessarily adding further material to the blade. This method thereby saves time in comparison to prior sealing methods, in which the sealant has to be removed and reapplied where a defective seal is found.

Once performance testing is complete, the adhesive bead 20a, 20b can be removed by hand, by peeling the solidified adhesive from the surface 22. The blade 10 may be heated to facilitate removal. Once removed, very little residue remains. The residue has been found not to damage blades, and is generally burned off during operation of the gas turbine engine.

While the invention has been described in conjunction with the examples described above, many equivalent modifications and variations will be apparent to those skilled in the art when given this disclosure. Accordingly, the examples of the invention set forth above are considered to be illustrative and not limiting. Various changes to the described embodiment may be made without departing from the spirit and scope of the invention.

Different thermoplastics could be used for sealing the holes, depending on the required adhesion properties. In particular, this will be dependent on the pressures used during testing, as higher pressures will require a stronger adhesion.

The invention claimed is:

1. A method of selectively sealing at least one cooling hole provided on an aerofoil component, the method comprising:

heating a surface of the aerofoil component such that the surface is above room temperature;

applying a thermoplastic material in a molten phase to the surface of the aerofoil component to cover one or more selected cooling holes while the surface is heated above room temperature to facilitate adhesion; and cooling the thermoplastic material to set the thermoplastic material.

2. The method according to claim 1, wherein the component is heated to between 50° C. and 60° C.

3. The method according to claim 1, wherein the component comprises a turbine blade of a gas turbine engine.

4. The method according to claim 1, wherein the aerofoil component comprises a nickel alloy.

5. The method according to claim 1, wherein the aerofoil component comprises a ceramic thermal barrier coating.

6. The method according to claim 1, wherein the thermoplastic material comprises Ethylene-vinyl acetate.

7. The method according to claim 1, wherein the applying step comprises applying a bead of thermoplastic material in a molten phase to the surface of the aerofoil component to cover one or more selected cooling holes while the surface is heated above room temperature to facilitate adhesion.

* * * * *